United States Patent Office 3,749,584
Patented July 31, 1973

3,749,584
DECAFFEINATION OF BEVERAGES
Ralph H. Kurtzman, Jr., and Sigmund Schwimmer, Berkeley, Calif., assignors to the United States of America as represented by the Secretary of Agriculture
No Drawing. Filed Mar. 28, 1972, Ser. No. 238,923
Int. Cl. A23f 1/10
U.S. Cl. 99—69         6 Claims

ABSTRACT OF THE DISCLOSURE

Coffee, tea, and the like are decaffeinated by a procedure wherein caffeine is metabolized by a microorganism, Penicillium crustosum.

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

The invention relates to and has among its objects the provision of novel processes for decaffeinating coffee, tea, and other products which contain caffeine. Further objects and advantages of the invention will be evident from the following description wherein parts and percentages are by weight unless otherwise specified.

In the following description, emphasis is directed to application of the invention to coffee. This is by way of illustration and not limitation. In its broad compass the invention can be practiced on all kinds of products which contain caffeine, these including not only coffee but also tea, kola, maté, guarana, and the like.

Presently, coffee is decaffeinated by a process wherein green coffee beans are first softened with high-pressure steam. Next a solvent, such as trichloroethylene, chloroform, benzene, alcohol, or the like, is applied to extract the caffeine. The solvent is removed by subsequent resteaming. Several disadvantages are, however, inherent in such a procedure. First, many of the volatiles necessary for good flavor and aroma are expelled by such vigorous conditions. Second, a small proportion (usually 0.1 to 0.3%) of the solvent used for the extraction cannot be removed from the product. The presence of polychlorinated compounds, such as trichloroethylene, in the human diet should not be tolerated.

A primary object of the invention is to remedy the problems outlined above. In accordance with the invention, decaffeination is accomplished by the use of a particular microorganism, Penicillium crustosum, which has the ability to metabolize caffeine, that is, to consume and grow on this compound. In this way the caffeine content of all kinds of substances can be substantially reduced or eliminated entirely. The process of the invention is not only effective to attain reduction in caffeine content but also has the advantages that mild temperatures are employed in the fermentation, whereby vaporization of flavor components is minimized, and that no halogenated solvents are employed. The process of the invention also has the advantage that the aroma, flavor, and color of the starting products are not altered.

In a typical practice of the invention, the coffee or other product to be decaffeinated is extracted with water in conventional manner. The resulting extract is then fermented with Penicillium crustosum (hereinafter referred to as PC). The resulting extract now having a reduced content of caffeine is treated to remove the microorganism, and may then be used directly or may be preserved in conventional manner (e.g., dried) for future use in preparing beverages.

To prepare inocula for use in a practice of the invention, PC is cultured on a medium containing caffeine as essentially the only nitrogen source. Typically, one uses media known in the art such as Hoagland solution, or Czapek's solution, together with sugar and caffeine. Since a medium free of nitrogen (other than that in the caffeine) is desired, the typical metal nitrate salts used in Hoagland or Czapek's solution are replaced by metal chloride salts, e.g., potassium chloride in place of potassium nitrate. The concentration of caffeine in the medium is generally about 0.1 to 0.3% and that of sugar (sucrose, glucose, or the like) about 1 to 3%. The culture is conducted under aerobic conditions, typically by the usual shake flask technique, and in the usual temperature range of about 20–38° C., with the lower temperature being preferred. For best results, the organism is transferred to fresh medium every three or four days.

Cultures grown on conventional media as described above (or the cells isolated from such cultures) can be used directly as inocula in conducting decaffeination. In an alternative and preferred embodiment of the invention, the culture is not used directly but is transferred to a medium of coffee extract. After growth on this medium, the resulting culture or the cells isolated therefrom are used for decaffeination. In a typical practice of this modification of the invention, one proceeds as follows: Coffee is extracted with water (for example, in conventional manner used in preparing coffee for beverage purposes) to produce an extract containing about 1 to 1.5% solids. Sugar is added to this extract in the concentration of about 1 to 3%. The resulting medium is inoculated with PC and cultured under aerobic conditions at about 20° C. and for a time of not more than 16 hours. The resulting culture can be used directly as an inoculum, or, preferably, the cells are isolated as by centrifugation and used as the inoculum.

In a practice of the invention an inoculum of PC is incorporated with the aqueous extract to be decaffeinated, and the fermentation is carried out under conditions generally conventional in fungal fermentations. The inoculation may be with a culture of the organism or with cells separated from the other components of the culture. The proportion of added cells may be varied depending on the time desired for the fermentation. Thus in general, the greater the concentration of added cells, the faster will be the consumption of caffeine. Aerobic conditions are employed in the fermentation and such can be achieved by exposing the surface of the system to air, or, if the fermentation is carried out in a deep layer of liquid, one may bubble air therethrough.

In the event that the aqueous extract under treatment contains little or no sugar (as is the case with coffee extracts), it is necessary to add a minor proportion of sugar to attain a rapid removal of caffeine. Various sugars such as sucrose, glucose, invert sugar, etc. can be employed. Generally, one adds about 1–3%, depending on the particular sugar employed; a preferred concentration is about 1%.

The fermentation is carried out at temperatures conventionally used for fermentation processes. Generally, it is preferred to employ a temperature about from 20 to 38° C. In general, the process will proceed faster with increasing temperature. The fermentation is usually carried out at the natural pH of coffee, that is, about 5.0–5.1. A more rapid rate of decaffeination is attained where the extract is made somewhat more acidic, i.e., brought to a pH of about 4.8. The lowering of the pH may be accomplished by adding suitable amounts of any edible acid such as hydrochloric, citric, tartaric, phosphoric, and the like.

The fermentation is allowed to continue until the caffeine is substantially decreased or essentially removed. The time required to reach such result depends, as noted above, on such factors as the proportion of added inoculum, the temperature, the concentration of added sugar, etc. Usually, caffeine removal is complete in about 6 to 72 hours.

After the fermentation has been carried out, the microbial cells are removed. This can be accomplished in any conventional manner. For instance, one may employ the following technique: The fermentation mixture is heated for a short time to destroy the microorganism. Typically, the mixture is heated to about 100° C. for about 30–60 seconds. The mixture is then centrifuged or filtered to separate the cellular material from the liquid. Alternatively, the fermentation liquid without destruction of the organism may be filtered using a fine-pore filtration medium which will prevent passage of microbial cells, spores, and cellular debris.

After removal of the microbial cells, the decaffeinated extract can be used directly or can be processed in conventional manner, for instance, it may be concentrated or it may be dehydrated by spray-drying, freeze-drying, or the like.

The fermentation in accordance with the invention is believed to proceed by a mechanism that involves a first step wherein caffeine is demethylated to theophylline, which is then further metabolized, probably by demethylation. This explanation is, however, tendered only to attempt to further illustrate the invention. It should not be construed, however, as forming any part of the invention.

EXAMPLES

The invention is further demonstrated by the following illustrative examples.

Example 1.—Routine maintenance of PC

PC was grown and maintained on an aqueous medium containing 0.088 M sucrose (3%), 0.01 M caffeine (0.2%), and Hoagland solution (0.01 M calcium chloride, 0.01 M potassium chloride, 0.004 M magnesium sulfate, 0.001 M potassium dihydrogen sulfate, 0.0002 M iron trichloride, and 0.001 M potassium hydrogen phosphate). The culture was shaken 200 r.p.m. in a 250-ml. Erlenmeyer flask at 20° C. and transferred to a fresh medium every four days.

A culture of PC has been deposited in the Stock Culture Collection of the United States Department of Agriculture, Northern Region Research Laboratory, Peoria, Ill. 61604, as *Penicillium crustosum*, strain NRRL 5452, from which organization samples of this strain may be obtained.

Example 2.—Preparation of the inoculum

Ground, roasted coffee was extracted with water in conventional manner in a coffee percolator, using about 4–5 parts coffee per 100 parts of water. The extract was cooled and sucrose (3%) was added. Then the extract was inoculated with a PC culture prepared as described in Example 1. The inoculated extract was cultured at 20° C. in a shake flask for 16 hours. Then, about 4 to 5 grams of the culture was removed, centrifuged, and the resulting pellet of fungal cells washed with distilled water. This pellet was used as the inoculum in the procedure of Example 3.

Example 3.—Decaffeination of coffee extract

Ground, roasted coffee was extracted with water in conventional manner in a coffee percolator. The extract had a solids content of about 1–1.5% and a caffeine content of 0.053% (by ultra-violet absorption).

Fifty ml. of the extract was cooled and placed in a flask together with the inoculum prepared in Example 2 plus 0.5 gram of sucrose. The flask was shaken at 200 r.p.m. for 6 hours at 20° C. The fungal cells were then removed by centrifugation.

The procedure as described above was then repeated several times, the only difference being in the time of fermentation. The results are tabulated below.

| Time of fermentation, hours: | Reduction in caffeine concentration, percent |
| --- | --- |
| 2 | 15 |
| 5 | 43 |
| 6 | 50 |
| 11 | 78 |

Having thus described our invention, we claim:

1. A process for reducing the caffeine content of aqueous extracts containing the same, which comprises fermenting the extract witth *Penicillium crustosum* and separating the so-treated extract from cellular material.

2. A process for reducing the caffeine content of an aqueous extract of coffee, which comprises fermenting the said extract with *Penicillium crustosum* and separating the so-treated extract from cellular material.

3. A process for reducing the caffeine content of a food product containing the same, which comprises:
   (a) preparing an aqueous extract of the food product,
   (b) inoculating the said extract with *Penicillium crustosum*,
   (c) fermenting the inoculated extract under aerobic conditions at a temperature of about 20 to 38° C. for a period of time sufficient to obtain substantial reduction in its content of caffeine, and
   (d) separating the so-treated extract from cellular material.

4. The process of claim 3 wherein the food product is coffee.

5. The process of claim 3 wherein the inoculation is made with *Penicillium crustosum* which has been grown on a medium wherein caffeine is essentially the only nitrogen source.

6. The process of claim 3 wherein the fermentation of Step (c) is applied to an extract containing added sugar in a concentration of about from 1 to 3%.

References Cited

FOREIGN PATENTS 53500  11/1942  Netherlands _____ 99—69

OTHER REFERENCES

Grant; Hackh's Chemical Dictionary 4th ed., 1969, p. 495.

FRANK W. LUTTER, Primary Examiner
WILLIAM L. MENTLIK, Assistant Examiner

U.S. Cl. X.R.

195—2